US010023219B2

(12) United States Patent
Kitazawa

(10) Patent No.: US 10,023,219 B2
(45) Date of Patent: Jul. 17, 2018

(54) SNOW SURFACE SKIMMER

(71) Applicant: Sawato Kitazawa, Chino (JP)

(72) Inventor: Sawato Kitazawa, Chino (JP)

( * ) Notice: Subject to any disclaimer, the term of this patent is extended or adjusted under 35 U.S.C. 154(b) by 0 days.

(21) Appl. No.: 15/110,995

(22) PCT Filed: Jan. 18, 2014

(86) PCT No.: PCT/JP2014/050864
§ 371 (c)(1),
(2) Date: Jul. 12, 2016

(87) PCT Pub. No.: WO2015/107682
PCT Pub. Date: Jul. 23, 2015

(65) Prior Publication Data
US 2016/0339941 A1 Nov. 24, 2016

(51) Int. Cl.
*B62B 13/00* (2006.01)
*B62B 13/04* (2006.01)
*B62B 17/02* (2006.01)
*B62B 17/06* (2006.01)
*B62B 17/08* (2006.01)
*B62B 13/16* (2006.01)

(52) U.S. Cl.
CPC .......... *B62B 13/043* (2013.01); *B62B 13/046* (2013.01); *B62B 13/16* (2013.01); *B62B 17/02* (2013.01); *B62B 17/061* (2013.01); *B62B 17/062* (2013.01); *B62B 17/063* (2013.01); *B62B 17/08* (2013.01); *B62B 2206/00* (2013.01)

(58) Field of Classification Search
None
See application file for complete search history.

(56) References Cited

U.S. PATENT DOCUMENTS

| 2,460,815 | A | * | 2/1949 | Dunkel | ............. | B62B 13/04 |
| | | | | | | 280/28.14 |
| 3,325,179 | A | * | 6/1967 | Bissett | ............. | B62B 13/04 |
| | | | | | | 280/25 |

(Continued)

FOREIGN PATENT DOCUMENTS

| FR | 2909630 A1 * | 6/2008 | ........... B62B 13/043 |
| JP | 8-019633 A | 1/1996 | |

(Continued)

OTHER PUBLICATIONS

International Search Report (PCT/ISA/210) dated Mar. 11, 2014, by the Japanese Patent Office as the International Searching Authority for International Application No. PCT/JP2014/050864.

*Primary Examiner* — Katy M Ebner
(74) *Attorney, Agent, or Firm* — Buchanan Ingersoll & Rooney PC

(57) ABSTRACT

The snow surface skimmer is provided with: a skimmer body; a steering handle, which extends upward at a slant from the skimmer body; a seat installed on a region of the skimmer body that is behind the steering handle; and a skimming board. The skimming board is detachably attached to the bottom surface of the skimmer body by a skimmer attachment mechanism so that the attachment position in the front-back direction is adjustable. A skimming board suited to the skimming person's body type, build, etc. can be attached to the skimmer body at the appropriate position in the front-back direction.

12 Claims, 12 Drawing Sheets

(56) References Cited

U.S. PATENT DOCUMENTS

| | | | |
|---|---|---|---|
| 4,310,169 A * | 1/1982 | Brough | A63C 5/03 280/14.1 |
| 4,886,283 A * | 12/1989 | Wells | A63C 5/00 280/14.1 |
| 5,566,959 A * | 10/1996 | Tiramani | A63C 5/03 280/21.1 |
| 6,431,562 B1 | 8/2002 | Vontobel | |
| 2002/0030333 A1 * | 3/2002 | Graham | A63C 5/16 280/14.27 |
| 2003/0214105 A1 * | 11/2003 | Sullivan | A63C 5/02 280/14.27 |
| 2005/0225042 A1 * | 10/2005 | Liu | A63C 5/03 280/14.21 |
| 2006/0197294 A1 * | 9/2006 | Yau | B62B 13/043 280/16 |
| 2006/0208437 A1 * | 9/2006 | Fitzgerald | B62B 13/04 280/15 |
| 2009/0014995 A1 * | 1/2009 | Gulbranson | B62B 13/043 280/809 |
| 2009/0140503 A1 * | 6/2009 | Kolesar | B61B 11/008 280/16 |
| 2009/0273175 A1 * | 11/2009 | Kriezel | B62B 13/043 280/845 |
| 2010/0133767 A1 * | 6/2010 | Arney | B62B 13/043 280/28.15 |
| 2010/0207338 A1 * | 8/2010 | Sulzenbacher | B62B 15/007 280/28.11 |
| 2011/0006504 A1 * | 1/2011 | Arnol | A63C 5/06 280/606 |

FOREIGN PATENT DOCUMENTS

| | | |
|---|---|---|
| JP | 8-310406 A | 11/1996 |
| JP | 10-309340 A | 11/1998 |
| JP | 2001-516306 A | 9/2001 |

* cited by examiner

Fig. 8(A)
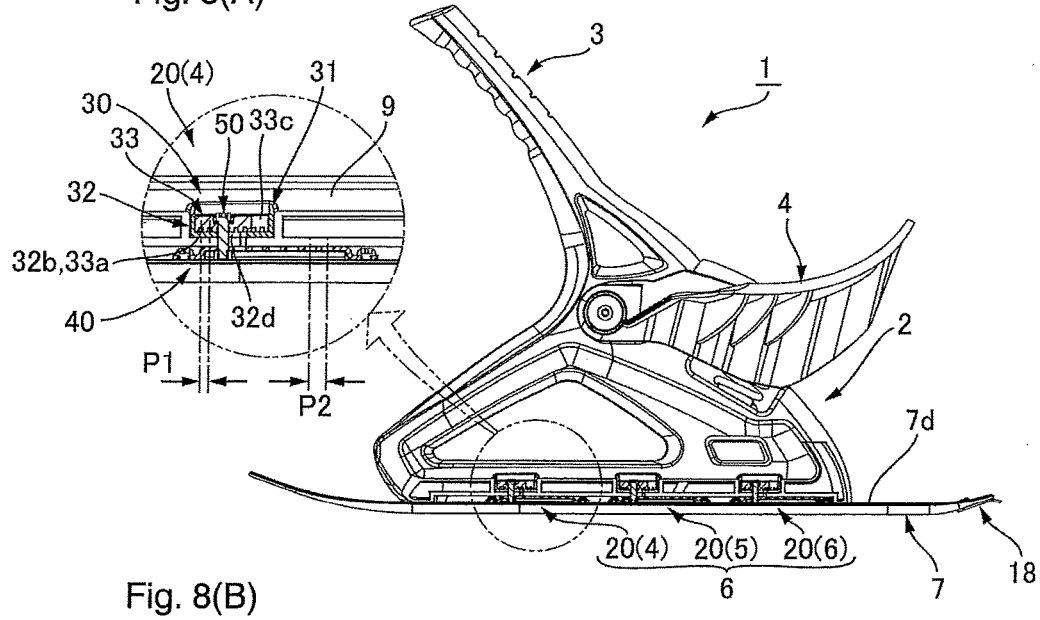
Fig. 8(B)
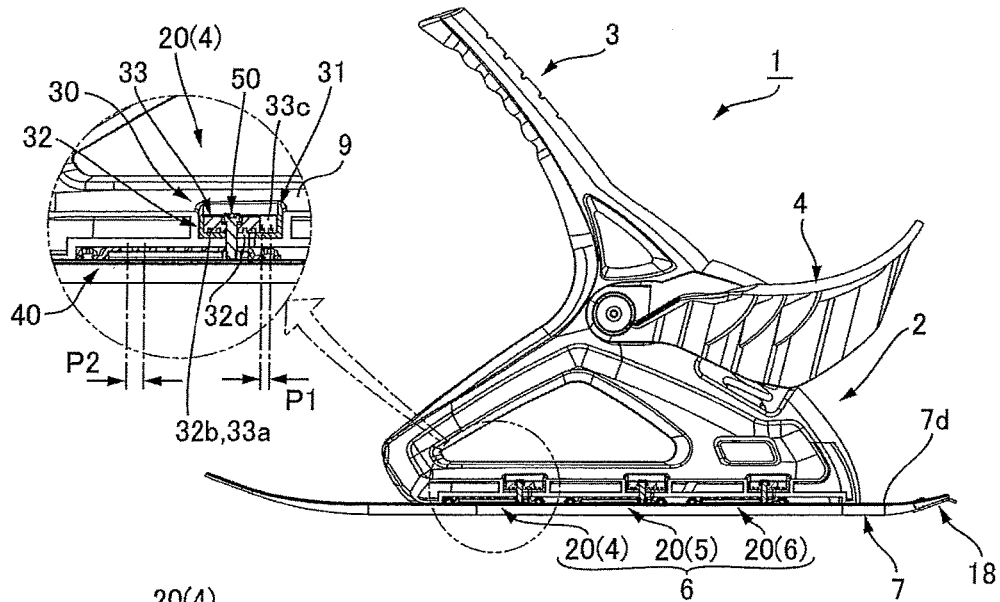
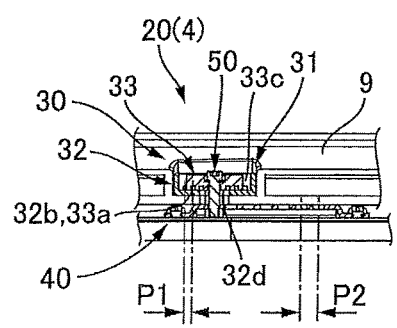
Fig. 8(C)

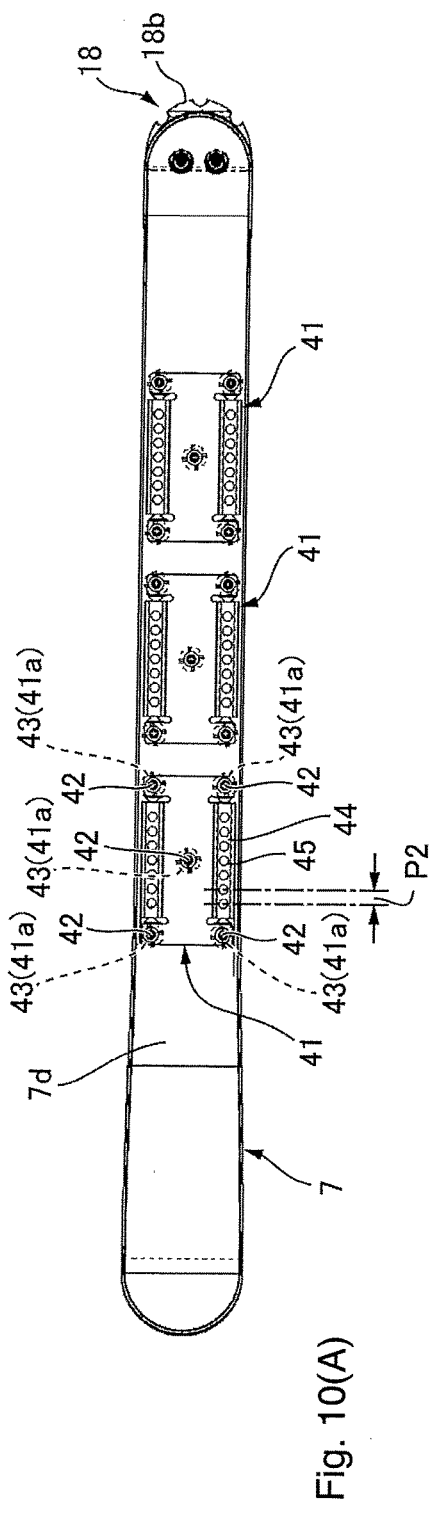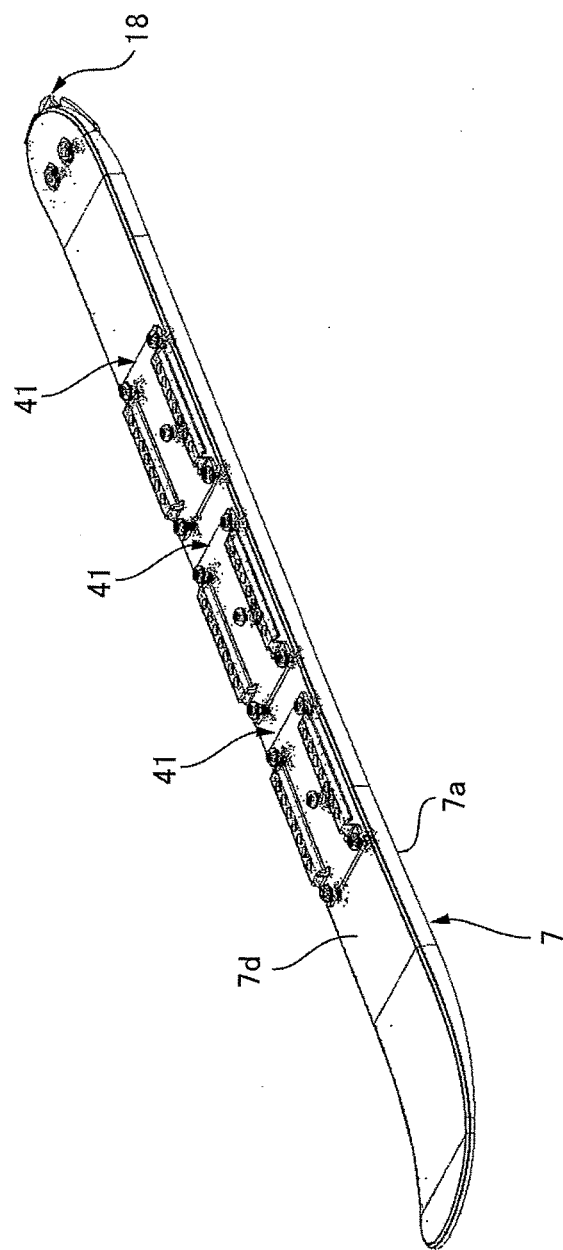
Fig. 10(A)
Fig. 10(B)

SNOW SURFACE SKIMMER

1. TECHNICAL FIELD

The present invention relates to a snow surface skimmer used for recreation or for sport.

2. BACKGROUND ART

Known examples of snow surface skimmers include those configured with a seat and a handle mounted on a body portion comprising a single skimming surface, as is disclosed in Patent Documents 1 and 2. In the ski sleigh device disclosed in Patent Document 1, a device body portion, comprising a handle and a blade portion of which the bottom surface is a skimming surface and which is long front-to-back, is integrally formed by injection molding, and a seat is attached thereto. The snow motorcycle disclosed in Patent Document 2 is configured with a handle and a saddle attached on top of a board-shaped element, having a shape resembling a snowboard of which the bottom surface is a skimming surface.

3. PRIOR ART DOCUMENTS

4. PATENT DOCUMENTS

Patent Document 1: JP 8-19633 A
Patent Document 2: JP 8-310406 A

5. DISCLOSURE OF THE INVENTION

Problems to be Solved by the Invention

In this type of snow surface skimmer, the length of the skimming surface, the position of the seat or saddle relative to the skimming surface, the position of the handle relative to the seat or saddle, and other features are fixed. Therefore, depending on the user's body type and build, there are instances in which the center of gravity of the user sitting in the seat or saddle greatly shifts forward or backward from the center of the skimming surface. Depending on the user, there are also instances in which the space between the handle and the seat or saddle is too small or too large.

Therefore, this type of snow surface skimmer is not very versatile, and it is not easy to obtain a snow surface skimmer suited to the user's body type and build. When the snow surface skimmer is not suited to the user's body type or build, it is a problem that skimmer is more difficult to operate and steer.

Skis, snowboards, and sleighs have skimming surfaces of different lengths, widths, and other features according to purpose, snow quality, and other factors. However, snow surface skimmers of the types disclosed in Patent Documents 1 and 2 are structured with a handle and seat provided to a body portion which comprises a single skimming surface, are generally high-priced, needing large storage space and being difficult to handle. Therefore, suck snow surface skimmers are inconvenient in that it is not easy to use a plurality of skimmers for different purposes, snow qualities, and other factors on a ski slope or the like.

In view of these matters, an object of the present invention is to provide a snow surface skimmer that can be adapted to the user's body type and build with a simple operation.

Another object of the present invention is to provide a snow surface skimmer that can be adapted for use according to purpose, snow quality, and other factors with a simple operation.

Means to Solve the Problems

To solve the problems described above, the snow surface skimmer of the present invention is characterized by comprising:
a skimmer body;
a steering handle which extends forward at an upward slant from a region of the skimmer body that is partway along the front-back direction of the skimmer;
a seat installed on a region of the skimmer body that is behind the steering handle;
a skimming board; and
a skimming board attachment mechanism for detachably attaching the skimming board to the bottom surface of the skimmer body.

The skimming board is detachably attached to the bottom surface of the skimmer body by the skimming board attachment mechanism. By attaching a skimming board of a length and width suited to a user's body type and build to the bottom surface of the skimmer body, a snow surface skimmer that is easy for a user to operate and steer can be achieved. If multiple types of skimming boards of different lengths, widths, and shapes are prepared, the snow surface skimmer can be altered to suit different purposes, snow qualities, and other factors merely by replacing the skimming board at the place of recreation. Consequently, the snow surface skimmer can be used for different purposes, with virtually the same ease among normal skis, snowboards, sleighs, and the like.

The skimming board attachment mechanism preferably makes it possible for the position where the skimming board is attached to the bottom surface to be varied in the front-back direction of the skimmer. By adjusting the attached position of the skimming board in the front-back direction, the front-back directional center of gravity of the user sitting in the seat and the front-back directional center of the skimming surface of the skimming board can be put in the optimal positions relative to each other, regardless of the user's body type and build.

Preferably, the skimming board attachment mechanism comprises a first connecting part attached to either one of the skimmer body and the skimming board, a second connecting part attached to the other of the skimmer body and the skimming board, and a bolt (connecting tool) for connecting and securing the first and second connecting parts, the first connecting part being a bolt-positioning part in which the bolt can be positioned at a first pitch in the skimmer front-back direction, and the second connecting part being a bolt-securing part in which the bolt can be threaded and secured at a second pitch in the skimmer front-back direction.

When the first and second pitches are set different, the positions can be adjusted in the skimmer front-back direction at narrower pitches than the first pitch or second pitch. For the positioning pitch, there is a limit on the minimum pitch due to factors such as the strength of the attachment clasps or the like. In such cases, if the skimming board attachment mechanism of the present invention is used, the position of the skimming board in the skimmer front-back direction can be adjusted by a shorter pitch.

In the snow surface skimmer of the present invention, the length of the bottom surface in the skimmer front-back direction is preferably at least ½, and more preferably at least ⅔, the length of the skimming board. The load of the user and the skimmer body is distributed in the front-back direction and exerted on the skimming board via the bottom surface, the skimmer board being long in the skimmer front-back direction. Consequently, stress concentration in the skimming board can be avoided, and a snow surface skimmer high in strength can be achieved.

The lengthwise center of the skimming board relative to the center of the bottom surface in the skimmer front-back direction should be in a position within a range of no more than ⅓ the length of the bottom surface in the skimmer length direction.

In the snow surface skimmer of the present invention, the skimmer body and the steering handle are preferably a single component made from an article injection-molded from a resin. The portion equivalent to the skimmer body in this single component preferably comprises a bottom reinforcing rib including the bottom surface and extending in the skimmer front-back direction, a front reinforcing rib extending rearward at an upward slant from the front end of the bottom reinforcing rib, a rear reinforcing rib extending forward at an upward slant from the rear end of the bottom reinforcing rib, and one or more first openings formed in at least part of the portion enclosed by the bottom reinforcing rib, the front reinforcing rib, and the rear reinforcing rib, and passing through in the skimmer width direction. In this case, the portion equivalent to the steering handle in this single component is a portion that extends upward at a forward slant from the upper end portion where the front reinforcing rib and the rear reinforcing rib converge.

Thus, because a triangle is formed in which the bottom reinforcing rib is the bottom side and the front and rear reinforcing ribs are the slanted sides, it is possible to form a skimmer body having high strength against force from the up-down and front-back directions. Because at least one first opening is formed in the portion within the triangle, the skimmer body can be made lighter in weight.

In the snow surface skimmer of the present invention, it is preferable to attach a belt to the snow surface skimmer for purposes such as making the snow surface skimmer more convenient to carry, and preventing the snow surface skimmer from going to slipping down to a different location on its own in cases such as when the skimming person has fallen off the snow surface skimmer while going downhill. For these purposes, preferably, the snow surface skimmer of the present invention has a belt of a predetermined length linked at both ends, a second opening passing through in the skimmer width direction is formed in the portion in the steering handle that is joined to the upper end portion, and the belt is attached to the skimmer body by being passed through the second opening.

To make the steering handle easier to grasp in the snow surface skimmer of the present invention, preferably, the upper end portion of the steering handle curves forward in the skimmer front-back direction along the length direction, a grip surface is formed in the outer peripheral surface of the upper end portion, protruding surfaces and curved surfaces are alternately formed at predetermined intervals in the up-down direction in the front surface portion on the curved side of the steering handle in the grip surface, and grooves are formed at predetermined intervals in the up-down direction in the rear surface portion of the convexly curved side of the steering handle in the grip surface.

With this configuration, a skimming person can grasp the steering handle without slipping, by fitting their thumb into a groove in the rear surface portion and fitting their remaining four fingers in the irregular surface of the front surface portion.

In the snow surface skimmer of the present invention, the sensation of sitting can be improved by making the seat to comprise a seat part supported by the skimmer body via a cushion, and a body-side connecting part attached to the skimmer body in the front region of the seat part, so as to be capable of turning about an axis line extending in the skimmer width direction.

In this case, it is preferable that the body-side connecting part of the seat be capable of being attached to the skimmer body in different positions in the skimmer front-back direction. The ease of operating and steering the snow surface skimmer can be improved by changing the position of the seat forward or backward in accordance with the skimming person's body type and build.

The cushion can be a single coil spring, or a plurality of coil springs arranged in the skimmer front-back direction or the skimmer width direction.

The snow surface skimmer of the present invention preferably has a brake board detachably attached to the tail of the skimming board.

Next, the present invention is a skimming board capable of being attached to the skimmer body of the snow surface skimmer having the configuration described above, the skimming board characterized in that when the skimming board attachment mechanism includes a first connecting part attached to the skimmer body and a second connecting part attached to the skimming board, at least one component among the structural components of the second connecting part is attached.

In this configuration, when the first connecting part of the skimming board attachment mechanism is a bolt-positioning part in which the bolt can be positioned at a first pitch in the skimmer front-back direction and the second connecting part is a bolt-securing part in which the bolt can be threaded and secured at a second pitch in the skimmer front-back direction, the second connecting part includes an attachment plate, a plurality of bolt holes formed at the first pitch in the skimmer front-back direction in the attachment plate, an attachment plate securing bolt for securing the attachment plate to the skimming board, and a bolt-receiving part into which the attachment plate securing bolt is threaded and secured. In this case, in the skimming board for the snow surface skimmer of the present invention, among the attachment plate, the attachment plate securing bolt, and the bolt-receiving part, at least the bolt-receiving part is attached.

BRIEF DESCRIPTION OF THE DRAWINGS

FIGS. 8(A)-8(C) include explanatory drawings showing the skimming board attachment mechanism of the snow surface skimmer of FIG. 1;

FIGS. 10(A) and 10(B) include explanatory drawings showing part of the side of the skimming board of the skimming board attachment mechanism of FIGS. 8(A)-8(C);

6. MODE FOR CARRYING OUT THE INVENTION

Figure 1:
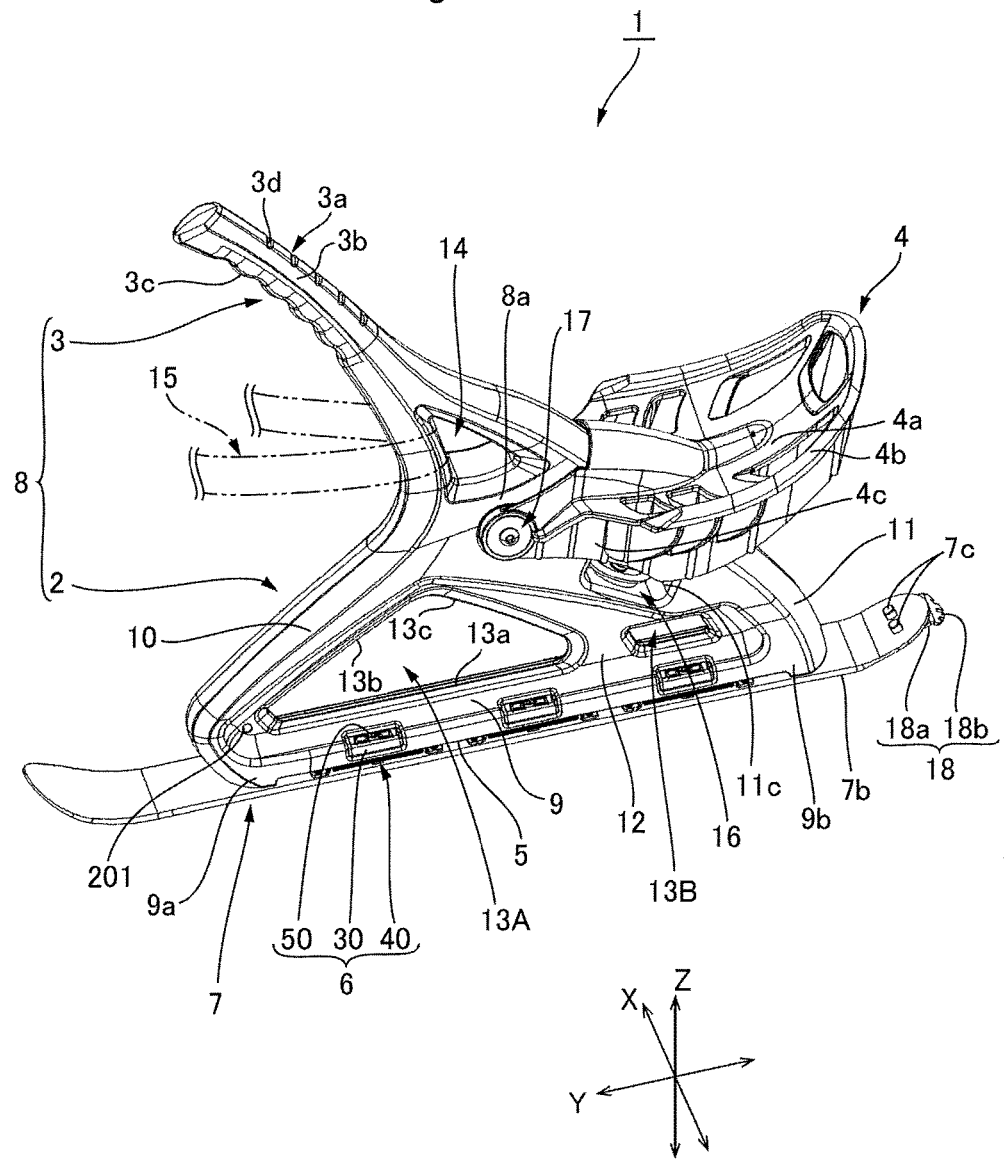
FIG. 1 is a perspective view showing a snow surface skimmer to which the present invention is applied.
Figure 2:
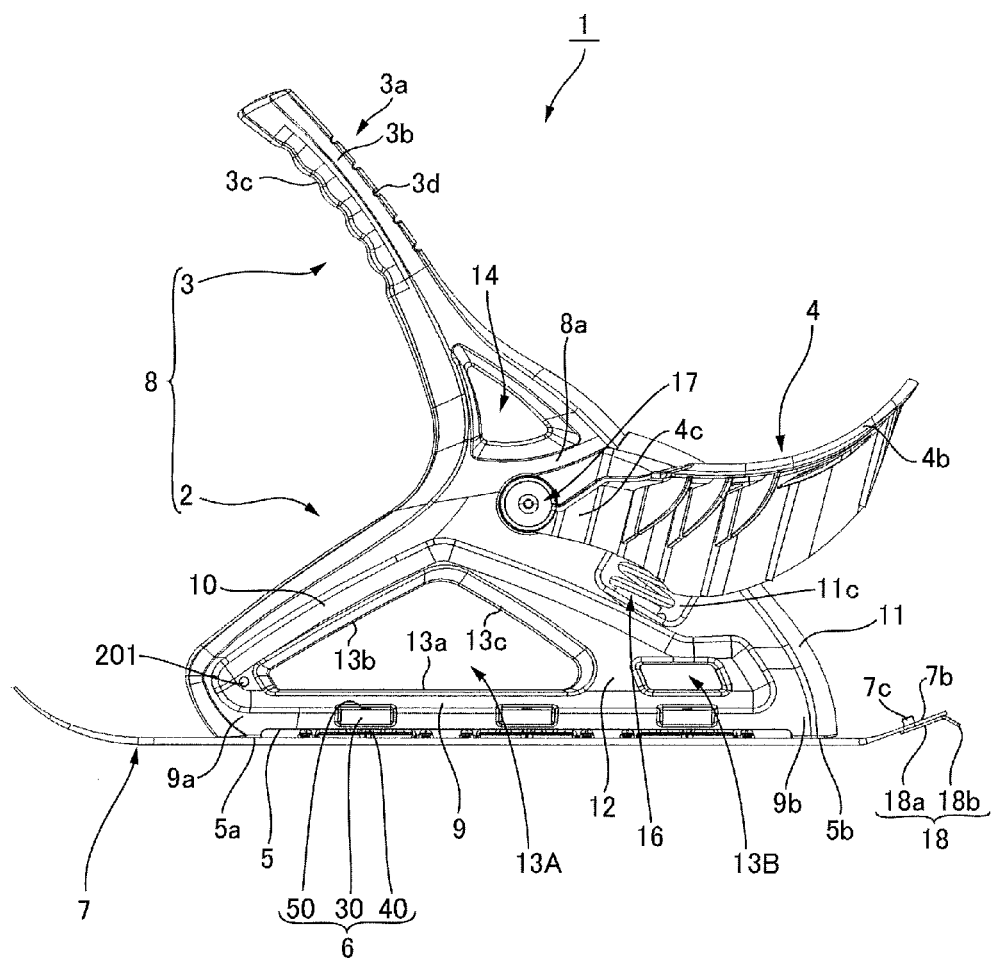
FIG. 2 is a right-side view of the snow surface skimmer of FIG. 1.
Figure 3:
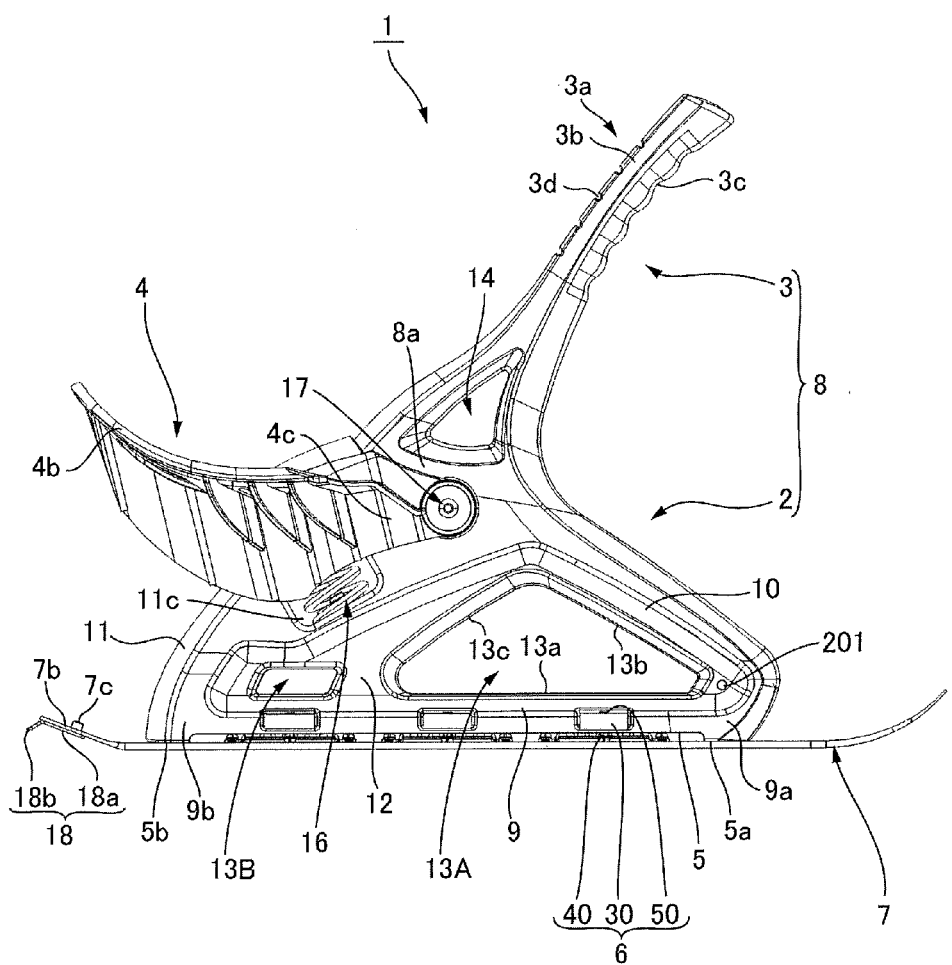
FIG. 3 is a left-side view of the snow surface skimmer of FIG. 1.
Figure 4:
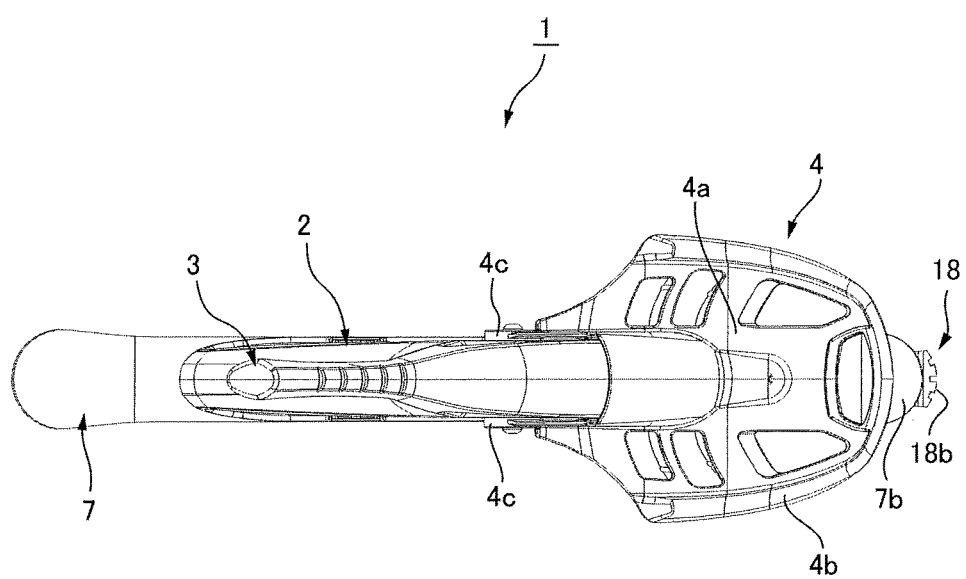
FIG. 4 is a plan view of the snow surface skimmer of FIG. 1.
Figure 5:
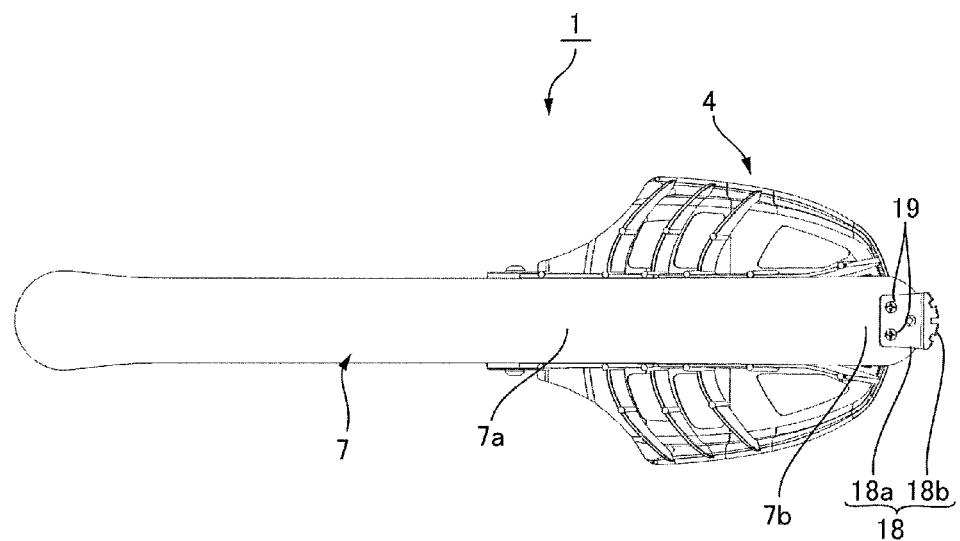
FIG. 5 is a bottom view of the snow surface skimmer of FIG. 1.
Figure 6:
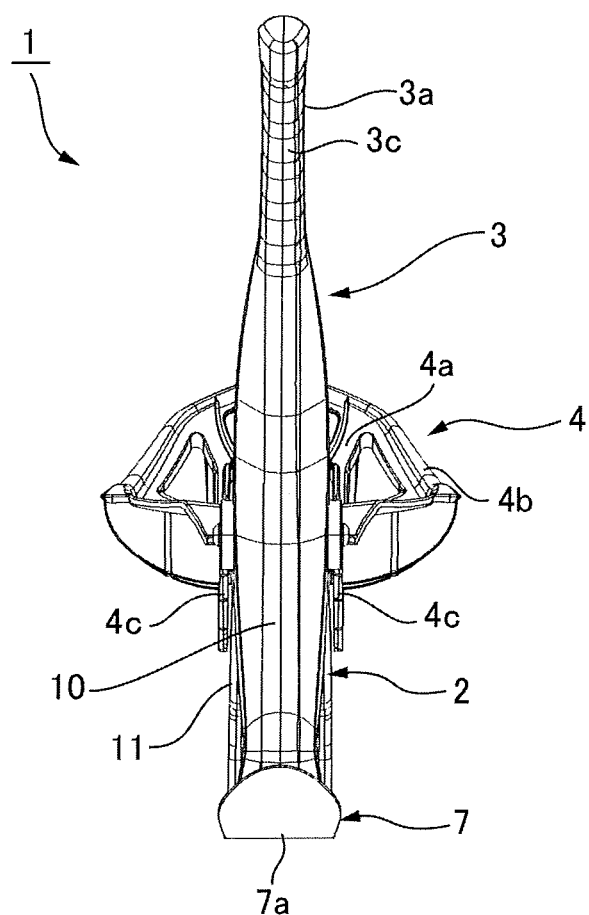
FIG. 6 is a front view of the snow surface skimmer of FIG. 1.
Figure 7:
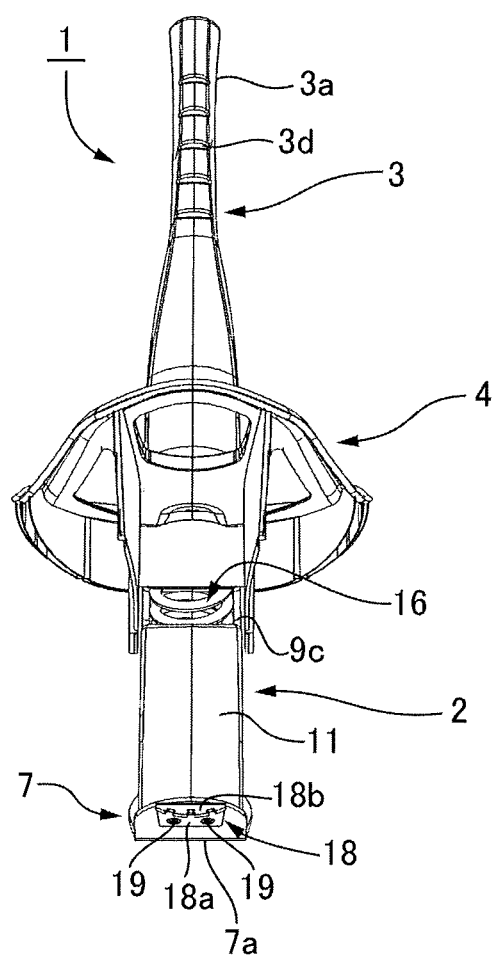
FIG. 7 is a rear view of the snow surface skimmer of FIG. 1.

An embodiment of a snow surface skimmer to which the present invention is applied is described below with reference to the drawings. FIG. 1 is an external perspective view showing a snow surface skimmer according to an embodiment of the present invention, FIGS. 2 to 7 are a right-side view, a left-side view, a plan view, a bottom view, a front view, and a rear view of the snow surface skimmer. In the description below, the front-back direction of the snow surface skimmer is indicated by Y, the width direction by X, and the up-down direction by Z, as shown in FIG. 1.

The snow surface skimmer 1 according to the present embodiment comprises a skimmer body 2, a steering handle 3 extending forward at an upward slant from a region on the skimmer body 2 in the middle of the front-back direction Y, and a seat 4 attached to a region on the skimmer body 2 to the rear of the steering handle 3. A bottom surface 5 of constant width, extending in the front-back direction Y, is formed on the bottom of the skimmer body 2. A front end surface 5a and a rear end surface 5b of the bottom surface 5 are flat surfaces that protrude slightly downward. A skimming board 7 is detachably attached to the bottom surface 5 by a skimmer board attachment mechanism 6. The skimming board 7 attached to the bottom surface 5 comes to be in contact with the front end surface 5a and the rear end surface 5b. The skimming board 7 is, e.g., substantially equal in width to the bottom surface 5, and longer in the front-back direction Y than the bottom surface 5. A common ski or snowboard can be used as the skimming board 7.

The skimmer body 2 and the steering handle 3 are a single component, hollow in the interior, made from an article injection-molded from a resin. This single component is referred to as an integrated skimmer body 8 as necessary in the description below. The skimmer body 2 and the steering handle 3 can be formed from a metal material such as aluminum or another material, and are not limited to a resin material or an injected-molded article.

The portion in the integrated skimmer body 8 that is equivalent to the skimmer body 2 comprises a bottom reinforcing rib 9 extending in the front-back direction Y in which the bottom surface 5 is formed, a front reinforcing rib 10 extending rearward at an upward slant from the front end part 9a of the bottom reinforcing rib 9, and a rear reinforcing rib 11 extending forward at an upward slant from the rear end part 9b of the bottom reinforcing rib 9. These ribs 9 to 11 are hollow molded articles.

A framework that is substantially triangular when viewed from the width direction X is formed by the bottom reinforcing rib 9, the front reinforcing rib 10, and the rear reinforcing rib 11. A board part 12 which is less thick in the width direction X than these ribs 9, 10, 11 is formed in the portion enclosed by these ribs. A triangular opening 13A and a parallel square parallelogram opening 13B are formed in the board part 12 as first openings passing through in the width direction X, making the skimmer body 2 lighter in weight. In the inner peripheral edge of the opening 13A, a bottom edge 13a extends from the front end part 9a side of the bottom reinforcing rib 9, along the bottom reinforcing rib 9 to a position in the middle of the bottom reinforcing rib 9 in the front-back direction Y, an inclined edge 13c to the rear thereof extends forward at an upward slant from the rear end of the bottom edge 13a, and an inclined edge 13b to the front thereof extends rearward at an upward slant from the front end of the bottom edge 13a to be joined to the top end of the inclined edge 13c in the rear.

The portion in the integrated skimmer body 8 that is equivalent to the steering handle 3 extends at a forward slant in substantially the same direction as the rear reinforcing rib 11, upward from an upper end part 8a where the front reinforcing rib 10 and the rear reinforcing rib 11 converge. A substantially triangular second opening 14, passing through in the width direction X, is formed in the upper end part 8a. This opening 14 functions as a belt through-hole, through which a belt 15, a wire, or the like can be passed as shown by the imaginary lines in FIG. 1. The belt 15 is, e.g., a tethering belt. An antitheft wire or chain can also be passed through this hole.

The steering handle 3 is composed of a hollow body having an ellipsoidal cross section in which the diameter is slightly larger in the front-back direction. The upper portion of the steering handle 3 is a grip part 3a that curves slightly forward in the front-back direction Y toward the top. In a grip surface 3b formed in the outer peripheral surface of the grip part 3a, an irregular surface 3c, in which concave and convex surfaces are alternately formed at predetermined intervals in the up-down direction, is formed in the front-surface portion of the curved surface side, and grooves 3d are formed at predetermined intervals in the up-down direction in the rear surface side. The grip part 3a is thereby easier to grasp, and slipping is less likely. The steering handle 3 can also be structured to be capable of extending and retracting in the up-down direction, and can be designed so that the height position of the grip part is adjustable. A T-shaped handle having grip parts formed in the left and right ends can also be used as the steering handle.

Next, the seat 4 is, e.g., a resin-molded article. A material other than resin, e.g., a metal material or the like, can also be used to form the seat. The seat 4 comprises a sitting part 4b on which a seat surface 4a is formed, and left and right body-side connecting parts 4c attached so as to be capable of turning in the up-down direction relative to the skimmer body 2. The sitting part 4b is wider than the skimmer body 2, and the lower portions thereof on both sides in the width direction X extend forward into the left and right body-side connecting parts 4c.

The sitting part 4b is positioned above the rear reinforcing rib 11 of the skimmer body 2. The front portion of the sitting part 4b is shaped to rise upward along the top-surface portion of the rear reinforcing rib 11. A concave part 11c is formed in a region of the rear reinforcing rib 11 in the middle of the up-down direction Z, and one coil spring 16 that functions as a cushion of the seat 4 is mounted in this concave part 11c. The coil spring 16 is positioned in the center of the sitting part 4b in the width direction X, and is arranged as being inclined slightly rearward relative to the up-down direction Z, between the bottom surface of the concave part 11c and the rear surface of the sitting part 4b.

The front ends of the left and right body-side connecting parts 4c are turnably linked to both ends of a support pin 17 extending in the width direction X. The support pin 17 is fixed to a portion of the upper end part 8a in the skimmer body 2. The seat 4 is held by the coil spring 16 in a position of being raised upward from the skimmer body 2. When a skimming person sits in the seat 4, the coil spring 16 is compressed and the seat 4 sinks down with the support pin 17 in the center. The lowest position of the seat 4 is where the sitting part 4b of the seat 4 comes into contact with the rear reinforcing rib 11.

A single coil spring 16 is used in the present example, but it is also possible for the seat 4 to be supported by, e.g., two coil springs. For example, two coil springs can be arranged in the width direction X. It is also possible to make the attached position of the support pin 17 adjustable relative to the skimmer body 2. For example, if pin holes for the support pin 17 are formed in two locations in the front-back direction Y in the upper end part 8a of the skimmer body 2, the position of the seat 4 can be adjusted in the front-back direction Y. Furthermore, multiple types of seats, with different sizes, seat surface heights, seat surface shapes, and other features can be prepared as the seat 4, and a seat suited to the skimming person can be attached.

An attachment hole 201 for footrests (pedals) is formed in the front end part of the skimmer body 2. The attachment hole 201, which passes through in the width direction X, is formed in the corner of the skimmer body 2 where the bottom reinforcing rib 9 and the front reinforcing rib 10 converge. A pair of left and right footrests (not shown) can be attached as necessary in the attachment hole 201.

Next, a brake board 18 is attached to the skimming board 7. The brake board 18 is detachably attached to a tail 7b in a bottom surface 7a, which is the skimming surface of the skimming board 7. The brake board 18 comprises an attached portion 18a which is attached to the bottom surface portion of the tail 7b, and a hook portion 18b protruding rearward from the rear end of the attached portion 18a and bent at a downward slant. A pair of left and right screw holes are formed in the attached portion 18a, and the brake board 18 is secured to the skimming board 7 by screws 19 passed through these screw holes. A pair of left and right screw-receiving parts 7c are formed in the tail 7b of the skimming board 7, and the screws 19 are threaded into and secured in these screw-receiving parts. If different types of brake boards 18 are prepared, the brake board preferred by the skimming person can be attached.

(Skimming Board Attachment Mechanism)

Figure 9A:
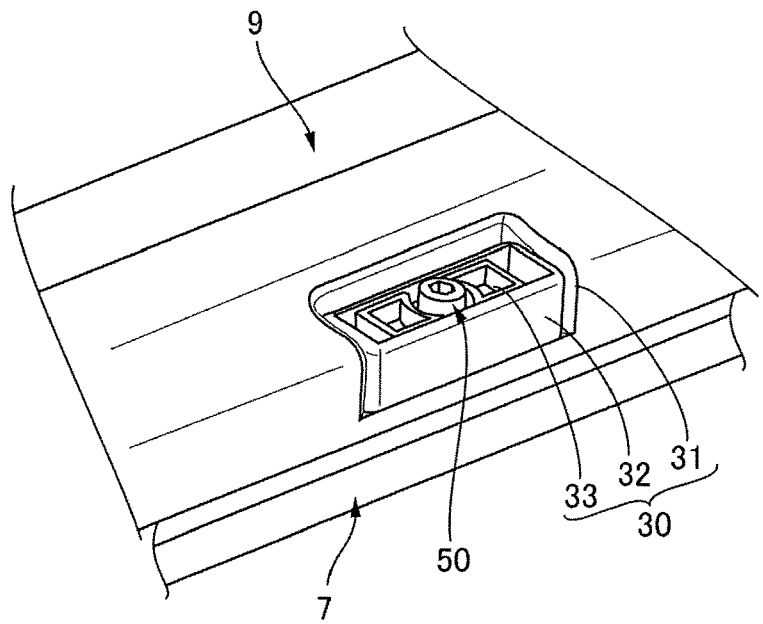
FIGS. 9(A) and 9(B) include a partial perspective view and an exploded perspective view showing part of the skimming board attachment mechanism of FIGS. 8(A)-8(C)
Figure 9B:
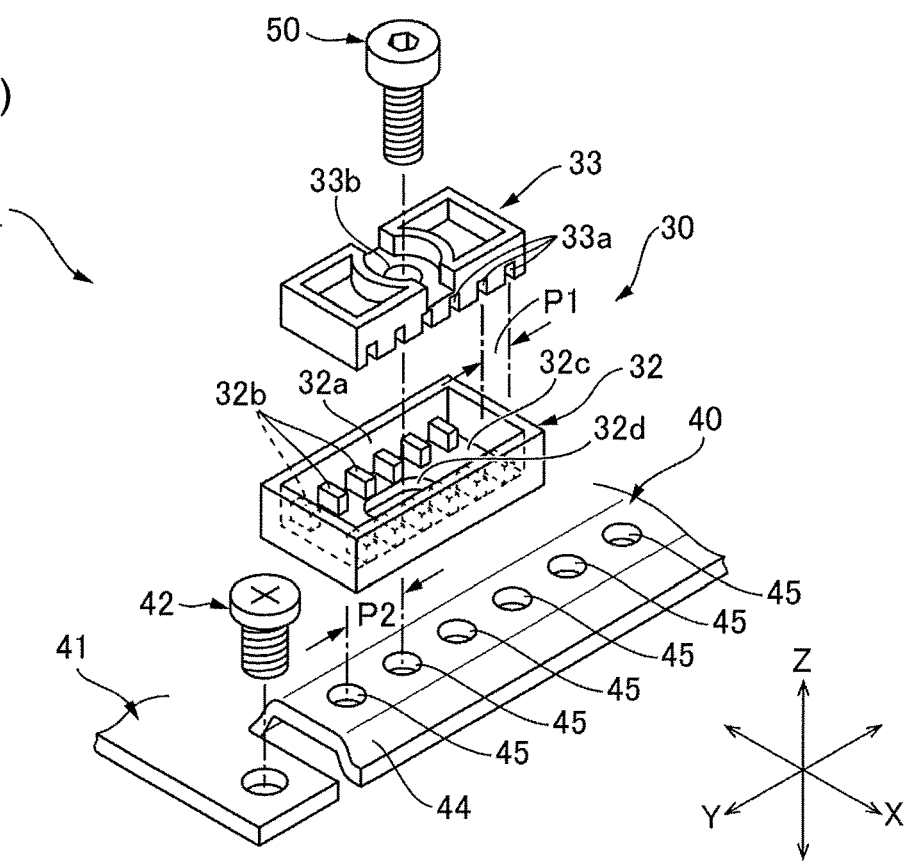

FIGS. 8(a), (b), and (c) are explanatory drawings showing the skimming board attachment mechanism 6, FIG. 8A) showing the skimming board 7 as being attached to the skimmer body 2 in a position farthest to the rear in the front-back direction Y, FIG. 8(B) showing the skimming board 7 as being attached to the skimmer body 2 in a position farthest to the front in the front-back direction Y, and FIG. 8(C) showing the skimming board 7 as being attached to the skimmer body 2 in a position forward by one pitch P1 from the farthest rear position in the front-back direction Y. FIG. 9(A) is an explanatory drawing showing part of the skimming board attachment mechanism 6, and FIG. 9(B) is an explanatory drawing showing the structural components of the skimming board attachment mechanism 6. FIGS. 10(a) and (b) are a plan view and a perspective view of the skimming board 7, showing the structural components of the skimming board attachment mechanism 6 attached to the skimming board 7.

The purpose of the skimming board attachment mechanism 6 is to detachably attach the skimming board 7 to the bottom surface 5 of the skimmer body 2, and the attached position can be varied in the front-back direction Y. In the present example, attachment parts 20(1) to 20(6) having the same structure are disposed in three locations in the front-back direction Y in regions on the left and right sides of the bottom reinforcing rib 9 of the skimmer body 2. In FIGS. 8(A)-8(C), only the right-side attachment parts 20(4), 20(5), and 20(6) are shown. Therefore, the skimming board 7 is secured to the bottom surface 5 of the skimmer body 2 in a total of six positions. Because the attachment parts 20(1) to 20(6) have the same configuration, the configuration of the attachment part 20(4), which is the farthest forward on the right side, is described.

The attachment part 20(4) comprises a first connecting part 30 attached to either one of the skimmer body 2 or the skimming board 7, a second connecting part 40 attached to the other, and a securing bolt 50 for connecting and securing the first and second connecting parts 30, 40. In the present example, the first connecting part 30 is attached to the skimmer body 2, and the second connecting part 40 is attached to the skimming board 7. Conversely, it is also possible to attach the first connecting part 30 to the skimming board 7, and the second connecting part 40 to the skimmer body 2.

The first connecting part 30 on the side of the skimmer body 2 is a bolt-positioning part into which the securing bolt 50 can be positioned and secured at a first pitch P1 in the front-back direction Y, and the second connecting part 40 is a bolt-securing part into which the securing bolt 50 can be threaded and secured at a second pitch P2 in the front-back direction Y. In the present example, the second pitch P2 is wider than the first pitch P1.

The first connecting part 30 comprises a concave part 31 formed in the right side of the bottom reinforcing rib 9 of the skimmer body 2, a first washer 32 fitted into the concave part 31, and a second washer 33 fitted into the first washer 32, as shown in FIGS. 8 and 9. The concave part 31 has a rectangular cross section and a constant length extending in the front-back direction Y, and opens upward and to the right. The first washer 32 has a box shape of exactly the right size and shape to fit into the concave part 31, and the top surface is an opening 32a. A plurality of positioning protrusions 32b having the same shape are formed within the first washer 32 at the first pitch P1 in the front-back direction Y. In the present example, the positioning protrusions 32b are formed along the internal corner portions between the inner peripheral bottom surface and the left and right inner peripheral side surfaces of the first washer 32, as can be discerned from FIG. 9(B).

The second washer 33 is inserted into the first washer 32 through the opening 32a thereof. The second washer 33 is a rectangular parallelepiped, and is able to slide in the front-back direction Y, which is the long-side direction, within a rectangular cross-sectioned concave part 32c of the first washer 32. A plurality of protruding engaging grooves 33a having the same shape are formed in the external corner portions between the bottom surface and the left and right side surfaces of the second washer 33, at the first pitch P1 along the long-side direction. The positioning protrusions 32b of the first washer 32 can be inserted into the protruding engaging grooves 33a from below. The engaging of the positioning protrusions 32b and the protruding engaging grooves 33a makes it possible for the position where the second washer 33 is fitted into the concave part 32c of the first washer 32 to be varied at the first pitch P1 in the front-back direction Y.

Formed in the second washer 33 is a circular bolt through-hole 33b, which passes through the washer in the up-down direction Z. Formed in the bottom plate portion of the first washer 32 is an ellipsoidal oblong hole 32d, for bolt insertion, passing through the washer in the up-down direction Z. The oblong hole 32d runs lengthwise in the front-back direction Y, and with the securing bolt 50 passed through, the second washer 33 can be moved in the front-back direction Y.

Thus, due to a double washer structure configured from the first and second washers 32, 33, the position of the securing bolt 50 attached to the skimmer body 2 can be varied at the first pitch P1 in the front-back direction Y within a predetermined range. Specifically, the position of the securing bolt 50 can be adjusted at the first pitch P1, from the position where the front-end surface of the second washer 33 comes into contact with the inside-end surface on the front side of the first washer 32 as shown in FIG. 8(A), to the position where the rear-end surface of the second washer 33 comes into contact with the inside-end surface on the rear side of the first washer 32 as shown in FIG. 8(B).

Next, the second connecting part 40 attached to the skimming board 7 comprises an attachment plate 41 disposed on the top surface 7d of the skimming board 7, securing bolts 42 for securing the attachment plate 41 to the skimming board 7, and bolt-receiving parts 43 incorporated into the skimming board 7, for threading and securing the securing bolts 42. Referring to FIGS. 10(A) and 10(B) for this description, a plurality of bolt-receiving parts 43, which regulate the attached positions of the three attachment plates 41, are disposed in the top surface 7d of the skimming board 7. In the present example, bolt-receiving parts 43 are provided in five locations for each attachment plate 41. Bolt holes 41a are formed in five locations, the center and the four corners, for each attachment plate 41. Each attachment plate 41 is secured to the determined position in the top surface 7d of the skimming board 7 as shown in FIGS. 10(A) and 10(B), by threading and securing the securing bolts 42 to the bolt-receiving parts 43 through the bolt holes 41a.

The attachment plate 41 that is in the front in the front-back direction Y is a plate for the left and right attachment parts 20(1), 20(4), the middle attachment plate 41 is a plate for the left and right attachment parts 20(2), 20(5), and the rear attachment plate 41 is a plate for the left and right attachment parts 20(3), 20(6).

In each attachment plate 41, a base part 44 extending in the front-back direction along the right-side edge is formed in the portion between the front and rear bolt holes 41a in this edge. The base part 44 is formed by bending the edge of the attachment plate 41 so that the edge is raised upward in a rectangular shape, as can be discerned from FIGS. 9(b) and 10(b). A plurality of bolt holes 45 are formed in the base part 44 at the second pitch P2 along the front-back direction Y. The securing bolt 50 can be threaded into and secured in each of the bolt holes 45.

In the front left and right attachment parts 20(1), 20(4), the securing bolts 50 of the first connecting parts 30 on the side of the skimmer body 2 are positioned in the positions farthest forward in the front-back direction Y, as shown in FIGS. 8(A)-8(C). The securing bolts 50 are then positioned in the bolt holes 45 that are farthest forward in the attachment plates 41 of the second connecting part 40 on the side of the skimming board 7. The securing bolts 50 are thereby similarly positioned in the farthest forward bolt holes 45 in the attachment parts 20(2), 20(5) in the middle of the front-back direction Y, and the rear attachment parts 20(3), 20(6) as well. Consequently, when the securing bolts 50 are threaded into and fixed in each of the attachment parts 20(1) to 20(6), the skimming board 7 is positioned and secured to the bottom surface 5 of the skimmer body 2 in the position farthest to the rear in the front-back direction.

By changing the positions of the bolt holes 45 in which the securing bolts 50 are secured, the attached position of the skimming board 7 can be adjusted in the front-back direction Y at the second pitch P2. FIG. 8(B) shows the skimming board 7 as being attached to the skimmer body 2 in the farthest rearward position.

In the first connecting part 30 on the side of the skimmer body 2, the position where the second washer 33 is attached to the first washer 32 moves by one positioning protrusion 32b rearward in the front-back direction, as shown in FIG. 8(C). The securing bolt 50 moves by a first pitch P1 rearward in the front-back direction Y, relative to the first connecting part 30. In this state, the securing bolt 50 is secured to the bolt hole 45 that is farthest forward in the second connecting part 40. As a result, the skimming board 7 is attached to the skimmer body 2 in a position moved forward by a first pitch P1 from the position in FIG. 8(A).

When the first pitch P1 is, e.g., 5 mm and the second pitch P2 is, e.g., 10 mm, the position of the skimming board 7 can be adjusted forward and backward by a pitch of 5 mm. The minimum pitch (the second pitch P2) of bolt holes 45 that can be formed in the base part 44 of the attachment plate 41 is limited by factors such as the strength of the attachment plate 41. If the skimming board attachment mechanism 6 of the present example is used, the position of the skimming board 7 in the front-back direction can be adjusted by a narrower pitch. A mechanism other than that of the present example can also be used as the mechanism for detachably attaching the skimming board 7 to the bottom surface 5 of the skimmer body 2. For example, a mechanism similar to the bindings of a ski can also be used.

(Other Examples of Skimming Board Attachment Mechanism)

Figure 11:
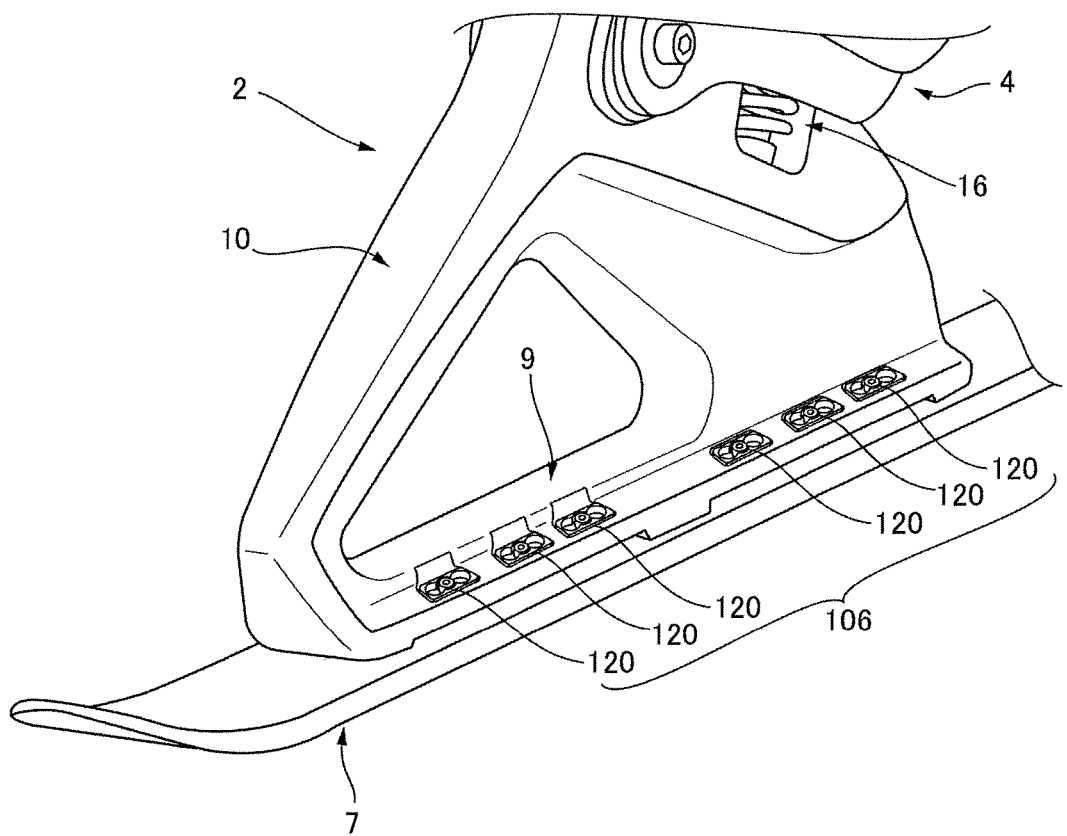
FIG. 11 is an explanatory drawing showing another example of a skimming board attachment mechanism.
Figure 12A:
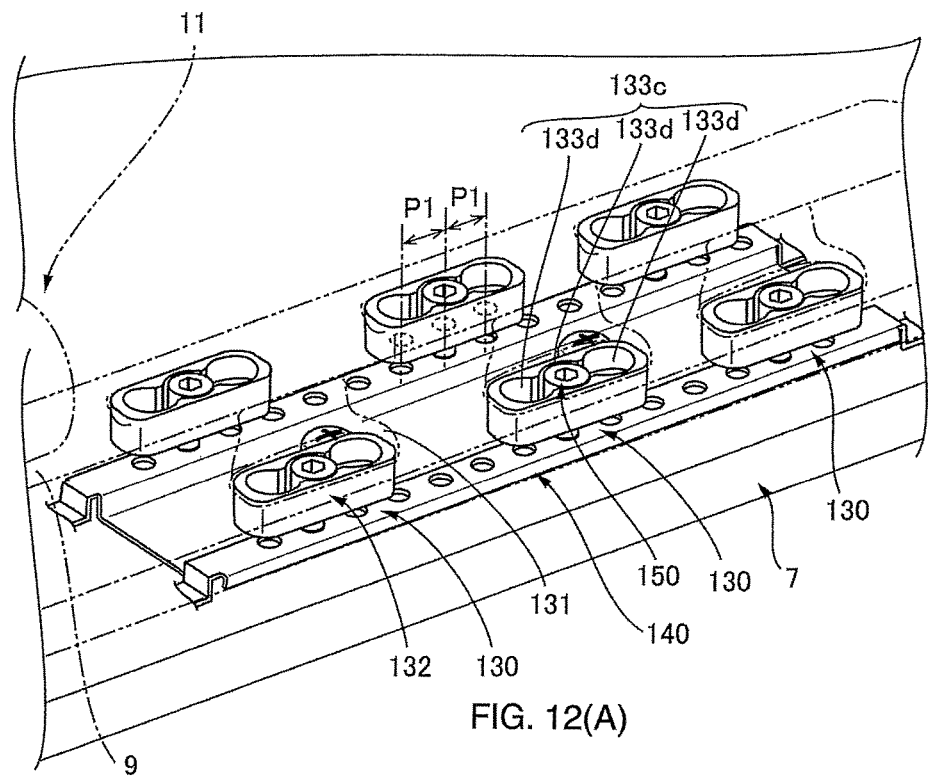
FIGS. 12(A) and 12(B) include explanatory drawings showing part of the skimming board attachment mechanism of FIG. 11.
Figure 12B:
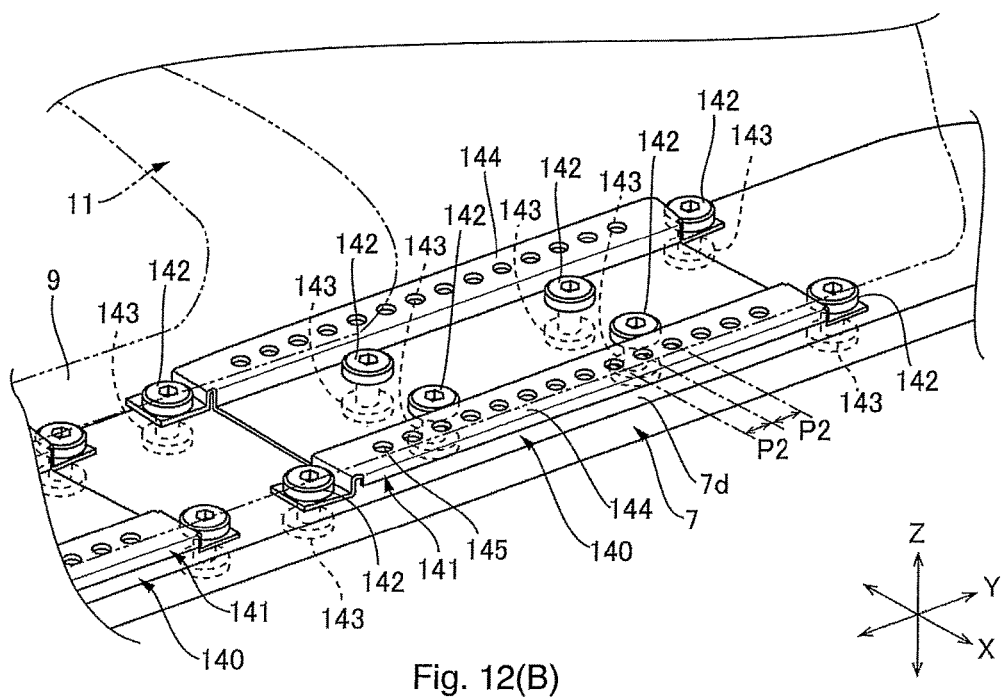

FIG. 11 is a perspective view showing a snow surface skimmer comprising a skimming board attachment mechanism having a different configuration than the one described above, FIG. 12(A) is an explanatory drawing showing first connecting parts of this skimming board attachment mechanism, and FIG. 12(B) is an explanatory drawing showing second connecting parts of the skimming board attachment mechanism. In these drawings, the same symbols are used to denote regions that correspond to the components in the snow surface skimmer 1 described above, and descriptions of these regions are omitted.

The skimming board attachment mechanism 106 shown in FIGS. 11 and 12 has the same attachment parts 120 disposed in six locations in the front-back direction Y, in regions on both sides of the bottom reinforcing rib 9 of the skimmer body 2. Each attachment part 120 comprises a first connecting part 130 attached to either one of the skimmer body 2 or the skimming board 7, a second connecting part 140 attached to the other, and a securing bolt 150 for connecting and securing the first and second connecting parts 130, 140. The first connecting parts 130 are attached to the skimmer body 2, and the second connecting parts 140 are attached to the skimming board 7. Conversely, it is also possible to attach the first connecting parts 130 to the skimming board 7 and the second connecting parts 140 to the skimmer body 2.

The first connecting parts 130 are bolt-positioning parts in which securing bolts 50 can be positioned at a first pitch P1 in the front-back direction Y and secured, and the second connecting parts 140 are bolt-securing parts in which securing bolts 150 can be threaded at the same second pitch P2 in the front-back direction Y and secured. The first connecting parts 130 each comprise a concave part 131 formed in the right side of the bottom reinforcing rib 9 of the skimmer body 2, and a washer 132 fitted into the concave part 131, as shown in FIG. 12(a). The concave parts 131 are oblong concave parts of fixed length in the front-back direction Y, opening upward. The washers 132 are shaped into exactly the right size and shape to fit into the concave parts 131, each washer comprising a concave part 133c of fixed depth opened in the top surface.

Three concave parts 133d, into which the head of a securing bolt 150 can be fitted, are formed at a first pitch P1 in the front-back direction Y in each concave part 133c. A bolt through-hole, passing through in the up-down direction Z, is formed in the center of the bottom of each concave part 133d. Therefore, the securing bolts 150 can each be attached in three positions at a first pitch P1 in the front-back direction Y.

The second connecting parts 140 attached to the skimming board 7 each comprise an attachment plate 141 disposed on the top surface 7d of the skimming board 7, securing bolts 142 for securing the attachment plate 141 to the skimming board 7, and bolt-receiving parts 143 incorporated into the skimming board 7, for threading and securing the securing bolts 142, as shown in FIG. 12(B). A plurality of bolt-receiving parts 143, which regulate the attached positions of the two front and rear attachment plates 141, are disposed in the top surface 7d of the skimming board 7. In the present example, bolt-receiving parts 143 are provided in eight locations for each attachment plate 141. In each attachment plate 141, bolt holes (not shown) are formed in the four corners and four locations on the inside, for a total of eight locations. A securing bolt 142 is fitted in each bolt hole. The securing bolts 142 are threaded into and secured in the bolt-receiving parts 143, whereby the attachment plates 141 are secured to the determined positions in the top surface 7d of the skimming board 7, as shown in FIG. 12(B).

The attachment plate 141 in the front in the front-back direction Y is a plate for six left and right attachment parts 120, and the rear attachment plate 141 is a plate for six left and right attachment parts 120. In the portions between the front and rear bolt holes in the left and right edges of each attachment plate 141, left and right base parts 144 are formed extending in the front-back direction along the edges. The base parts 144 are formed by bending the edges of the attachment plate 141 so that the edges rise upward in a rectangular shape. A plurality of bolt holes 145 are formed at a second pitch P2 along the front-back direction Y in the base parts 144. The securing bolts 150 can be threaded into and secured in the bolt holes 145.

The skimming board attachment mechanism 106 having this configuration enables the skimming board 7 to be attached to the skimmer body 2 at a first pitch P1 in the front-back direction. The attached position of the skimming board 7 can also be adjusted in the front-back direction by the second pitch P2 from the attached positions in the first pitch P1.

The length of the skimming board 7 is preferably no more than twice, and particularly no more than 1.5 times the length of the bottom surface in the front-back direction Y of the bottom surface 5 of the snow surface skimmer 1. When a skimming board 7 of this length is attached, the concentration of stress in the front-back direction on the skimming board 7, caused by the load acting on the side of the skimmer body 2, can be minimized.

The lengthwise center of the skimming board 7 relative to the center of the bottom surface 5 in the front-back direction Y is generally positioned within a range no more than ⅓ of the bottom surface length of the bottom surface 5 in the front-back direction Y.

The invention claimed is:

1. A snow surface skimmer, comprising:
    a skimming board configured to be attached to a skimmer body of the snow surface skimmer by a skimming board attachment mechanism for detachably attaching the skimming board to a bottom surface of the skimmer body,
    wherein the skimmer body includes:
    a steering handle extending forward at an upward slant from a region of the skimmer body that is partway along a skimmer front-back direction; and
    a seat installed on a region of the skimmer body that is behind the steering handle; and
    wherein a skimming board attachment mechanism has a first connecting part attached to the skimmer body and a second connecting part attached to the skimming board;
    the first connecting part of the skimming board attachment mechanism is a bolt-positioning part in which a bolt can be positioned at one of a plurality of first positions formed at a first pitch in the skimmer front-back direction, and the second connecting part is a bolt-securing part in which the bolt can be threaded and secured at a second pitch in the skimmer front-back direction; and
    the second connecting part has an attachment plate, a plurality of bolt holes formed at the second pitch in the skimmer front-back direction in the attachment plate, an attachment plate securing bolt for securing the attachment plate to the skimming board, and a bolt-receiving part into which the attachment plate securing bolt is threaded and secured,
    the skimmer board comprising:
    at least the bolt-receiving part among the attachment plate, the attachment plate securing bolt, and the bolt-receiving part.

2. The snow surface skimmer according to claim 1, wherein a lengthwise center of the skimming board relative to a center of the bottom surface in the skimmer front-back direction is in a position within a range of no more than ⅓ a length of the bottom surface in the skimmer front-back direction.

3. The snow surface skimmer according to claim 1, wherein
    the first pitch being different from the second pitch.

4. The snow surface skimmer according to claim 1, wherein
    a length of the skimmer board is equal to or less than two times a length of the bottom surface in the skimmer front-back direction.

5. The snow surface skimmer according to claim 1, wherein
    the skimmer body has a bottom reinforcing rib including the bottom surface and extending in the skimmer front-back direction, a front reinforcing rib extending rearward at an upward slant from a front end of the bottom reinforcing rib, a rear reinforcing rib extending forward at an upward slant from a rear end of the bottom reinforcing rib, and a first opening formed in at least part of a portion enclosed by the bottom reinforcing rib, the front reinforcing rib, and the rear reinforcing rib, and passing through in a skimmer width direction, and wherein the steering handle extends upward at a forward slant from an upper end portion where the front reinforcing rib and the rear reinforcing rib converge.

6. The snow surface skimmer according to claim 5, wherein the skimmer body and the steering handle are constituted as a single component made from an article injection-molded from a resin.

7. The snow surface skimmer according to claim 5, further comprising:

a belt of a predetermined length linked at both ends thereof; and a second opening formed in the upper end portion in the steering handle, the second opening passing through in a skimmer width direction, wherein the belt is attached to the skimmer body by being passed through the second opening.

8. The snow surface skimmer according to claim 7, wherein the steering handle has a grip part that is curved forward in the skimmer front-back direction along a length direction of the steering handle, and is formed with a grip surface in an outer peripheral surface of the upper end portion;

irregular surface, in which convex surfaces and concave surfaces are alternately formed at predetermined intervals in an up-down direction, is formed in a front surface portion on the grip surface; and grooves are formed at predetermined intervals in the up-down direction in a rear surface portion on the grip surface.

9. The snow surface skimmer according to claim 1, wherein the seat has:

a seat part supported by the skimmer body via a cushion; and a body-side connecting part attached to the skimmer body in a front region of the seat part, and configured to turn about an axis line extending in a skimmer width direction.

10. The snow surface skimmer according to claim 9, wherein the body-side connecting part of the seat is configured to be attached to the skimmer body in different positions in the skimmer front-back direction.

11. The snow surface skimmer according to claim 9, wherein the cushion is a single coil spring, or a plurality of coil springs arranged in the skimmer front-back direction or the skimmer width direction.

12. The snow surface skimmer according to claim 1, further comprising:

a brake board detachably attached to a tail of the skimming board.

* * * * *